United States Patent [19]

Monobe

[11] Patent Number: 5,022,447
[45] Date of Patent: Jun. 11, 1991

[54] SAFEGUARD APPARATUS FOR CUTTER OF JOINT PLANER

[75] Inventor: Juzaburo Monobe, Hiroshima, Japan

[73] Assignee: Ryobi Ltd., Hiroshima, Japan

[21] Appl. No.: 481,991

[22] Filed: Feb. 20, 1990

[30] Foreign Application Priority Data

Feb. 21, 1989 [JP] Japan .................. 1-19928[U]

[51] Int. Cl.⁵ .................. B27G 19/00; B27C 1/12
[52] U.S. Cl. .................. 144/251 R; 83/440.2; 83/443; 144/129; 144/253 G
[58] Field of Search .......... 144/251 R, 251 A, 251 B, 144/253 R, 253 G, 253 H; 83/440.2, 443; 409/134

[56] References Cited

U.S. PATENT DOCUMENTS

| | | | |
|---|---|---|---|
| 1,032,278 | 7/1912 | England | 144/253 G |
| 2,619,998 | 12/1952 | Okamuro | 144/253 G |
| 2,804,107 | 8/1957 | Taylor | 144/253 G |
| 2,872,957 | 2/1959 | Eschenburg | 144/253 G |
| 3,035,619 | 5/1962 | Gaskell | 144/253 G |

Primary Examiner—W. Donald Bray
Attorney, Agent, or Firm—Finnegan, Henderson, Farabow, Garrett, and Dunner

[57] ABSTRACT

An apparatus for safeguarding an exposed portion of the cutting blade of a joint planer is disclosed. The safeguard apparatus covers the exposed portion of the cutting blade behind the guide surface of the joint planer. The safeguard is pivotally connected to the guide surface, allowing the angle of the safeguard relative to the table to remain constant while the angle of the guide surface relative to the table changes. This safeguard is auxiliary to a main safeguard on the opposite side of the guide surface.

17 Claims, 5 Drawing Sheets

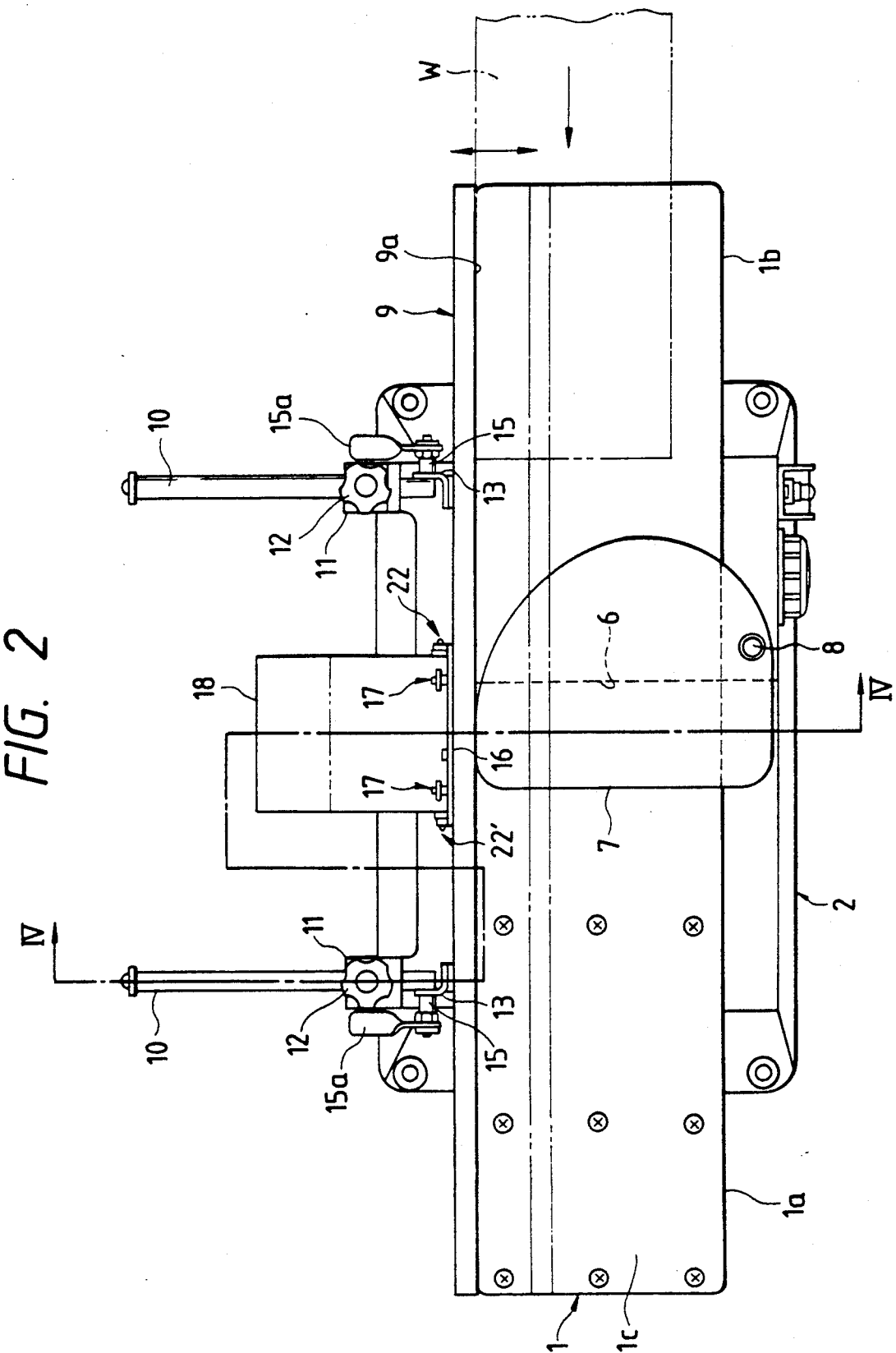

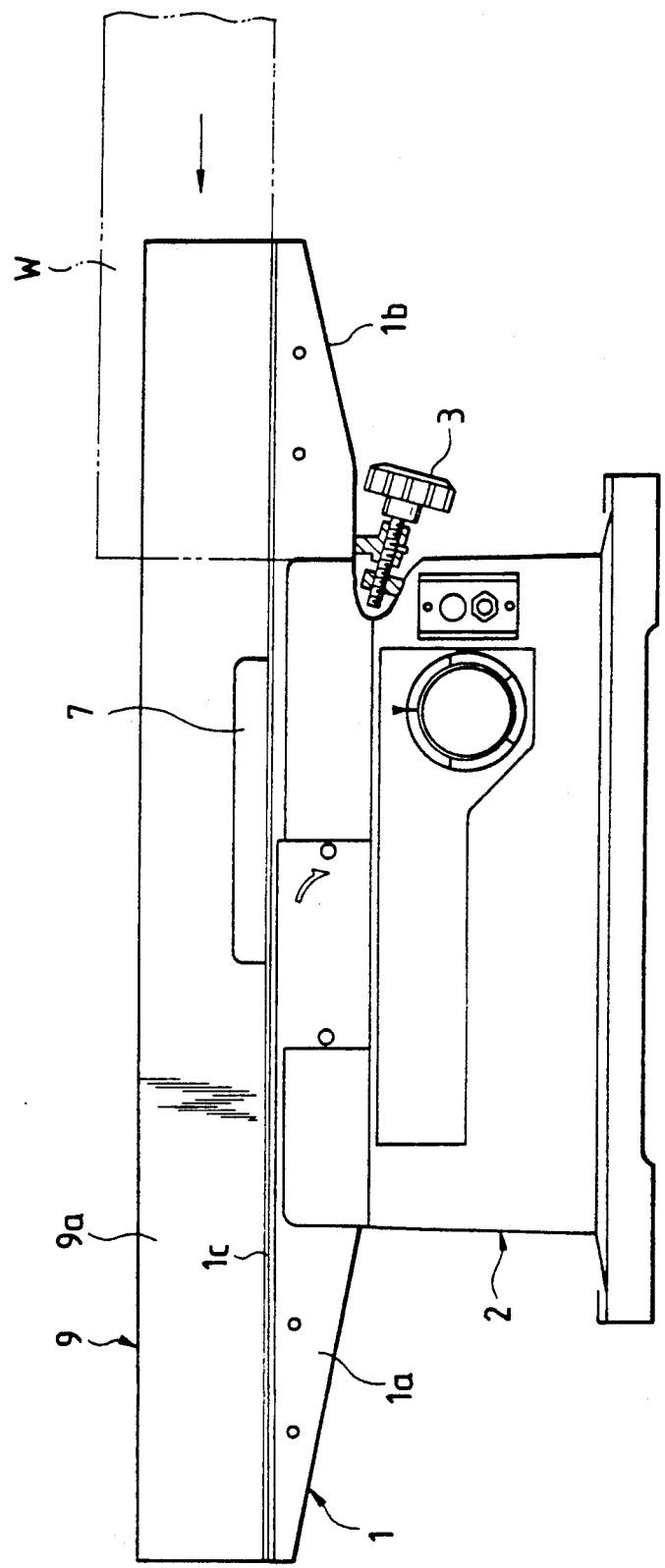

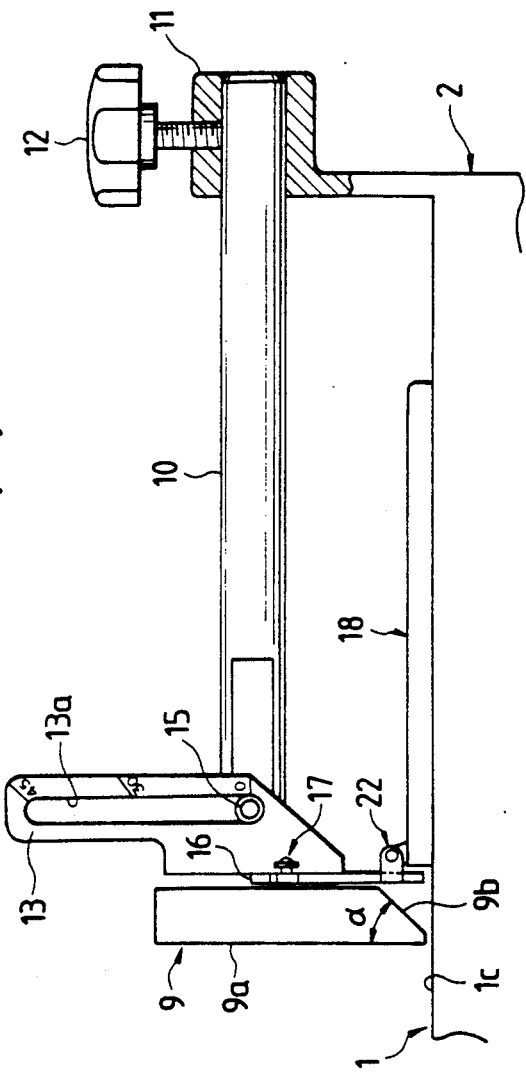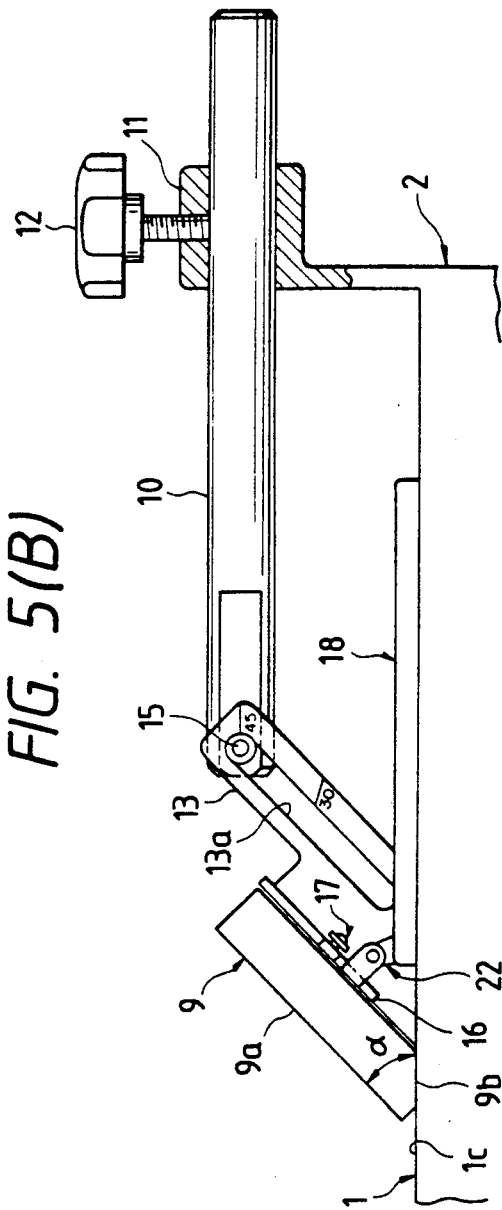

5,022,447

SAFEGUARD APPARATUS FOR CUTTER OF JOINT PLANER

BACKGROUND OF THE INVENTION

The present invention relates to a safeguard apparatus for covering the cutter head of a joint planer for planing a workpiece such as lumber.

A conventional joint planer has a main safeguard covering a portion of the cutting edge exposed over the table of the planer. The main safeguard can be pivoted by the moving-in of a workpiece on the planer. One purpose of the main safeguard is to prevent damage to the cutting edge of the cutter-head. Another purpose of the main safeguard is to prevent planed chips from degrading operator efficiency and safety by flying at the joint planer operator.

In addition to the, main safeguard, the joint planer includes an auxiliary safeguard attached to the rear of the joint planer fence to cover the exposed portion of the cutting edge of the cutter head behind the fence. If a workpiece whose width is much smaller than either the width or the length of the table is to be planed, or a workpiece is to be planed away from a portion of the cutting edge of the cutter head that has been accidentally damaged, the fence of the planer is displaced in the direction of the width of the table. When the fence is displaced in this manner, it is desirable that the auxiliary safeguard cover the additional exposed portion of the cutting edge behind the fence to prevent this exposed portion from posing a danger.

As shown at FIGS. 6(A) and 6(B), fence 601 is supported by slideable bars 602, which are slideably supported by support portions 603 of body 604 of the joint planer. Fence 601 can be displaced in the direction of the width of table 605, thereby being changed in angle relative to the slideable bars. Auxiliary safeguard 608 is connected to the rear of the fence 601 by attached portion 606 of elastically deformable bendable member 607 extending from one end of the auxiliary safeguard 608. The attached portion 606 of the bendable member 607 is secured to the fence 601 so that the auxiliary safeguard 608 and the bendable member are integrally connected to fence 601.

One problem with this arrangement is that a nearly triangular gap 609 is made between the auxiliary safeguard and the surface 605a of the table 605 when the fence is disposed at an angle of 90 degrees to the surface of the table as shown in FIG. 6(A). Thus, with the fence at 90 degrees, the auxiliary safeguard 608 does not completely cover the cutter head, and the planing section of the planer can pose a danger even when the planer is not operating. If the joint planer is operating in this case, an extraneous object such as a screw or a tool can enter into the planer through gap 609 and damage the planer or be propelled outward by the rotation of the cutter head, even when no workpiece is being planed. Another problem occurs when a workpiece is being planed, as the planed chips are likely to be propelled toward the eyes of the planer operator, thereby lowering his efficiency, and possibly injuring him.

In addition, bendable member 607 makes the auxiliary safeguard difficult to use, since bendable member 607 tends to retain a bent shape, and it is time-consuming to put auxiliary safeguard 608 into tight contact with surface 605a of table 605 when the angle of the guide surface of the fence 601 relative to the surface of the table is changed from 90 to 135 degrees. Further, the useful life of bendable member 607 is relatively short, because its thickness is made small enough to render it easy to bend, and, if the bendable member is repeatedly bent or used at a low temperature, it is likely to develop a crack precipitating a break allowing the auxiliary safeguard 608 to fall off.

SUMMARY OF THE INVENTION

The present invention was made in order to solve the above-mentioned problems. Accordingly, it is an object of the present invention to provide a safeguard apparatus to cover the cutter head of a joint planer, including a safeguard having a bottom surface which is always in tight contact with the surface of the table regardless of changes in the angle of the guide surface of the fence relative to the surface of the table.

To achieve this and other objects an apparatus for a joint planer including a cutter head and at least one safeguard comprises a fence having a guide surface and a rear; a pair of slideable bars attached to the fence and slideably supported by the joint planer and displaceable in the direction of the width of a table, allowing the angle of the guide surface of the fence relative to the table to vary; and a means having a bottom surface for covering the cutter head, the means being coupled by a connector to the rear of the fence, the connector being attached to the rear of the fence by a slide attachment so that the connector can be slid relative to the fence along the height thereof in conjunction with changes in the angle of the guide surface of the fence relative to the surface of the table, the covering means being pivotally coupled to the connector to allow the bottom surface of the covering means to remain substantially parallel to the table as the angle of the fence varies.

DESCRIPTION OF THE DRAWINGS

FIG. 2 is a plan view of the joint planer apparatus according to the embodiment of FIG. 1;

FIG. 3 is a cutaway front view of the safeguard apparatus according to an embodiment of the present invention;

FIG. 5(A) is a partial side view of the safeguard apparatus with the fence preset at an angle of 90 degrees relative to the surface of a table according to an embodiment of the present invention;

FIG. 5(B) is a partial view of the same safeguard apparatus with the fence preset at an angle of 145 degrees relative to the surface of the table;

DETAILED DESCRIPTION OF THE PREFERRED EMBODIMENT

In the preferred embodiment, a fence is attached to a pair of slideable bars supported by the body of the joint planer so as to be slideable and displaceable in the direction of the width of the table, thereby allowing the angle of the guide surface of the fence relative to the table to change. The auxiliary safeguard connector of the safeguard apparatus is attached to the rear of the fence by slide attachment means so that the connector can be slid relative to the fence along the height thereof in conjunction with the change in the angle of the guide surface of the fence relative to the surface of the table. The butt of the auxiliary safeguard is pivotally coupled to the connector so that the safeguard can swing relative to the connector in a plane orthogonal to the fence. The pair of slideable bars can be slid in their axial directions allowing the fence to be displaced by a desired length in the direction of the width of the table.

An embodiment of the present invention is hereafter described in detail with reference to the drawings.

As shown in FIGS. 2 and 3, table 1 of a joint planer consists of downstream table 1a secured to machine body 2, and upstream table 1b supported over machine body 2 by cut depth presetting threaded adjustment mechanism 3 so as to be translatable up and down. The exposed portion of cutter head 4 is covered with a safeguard apparatus which is the embodiment of the present invention.

Figure 4:
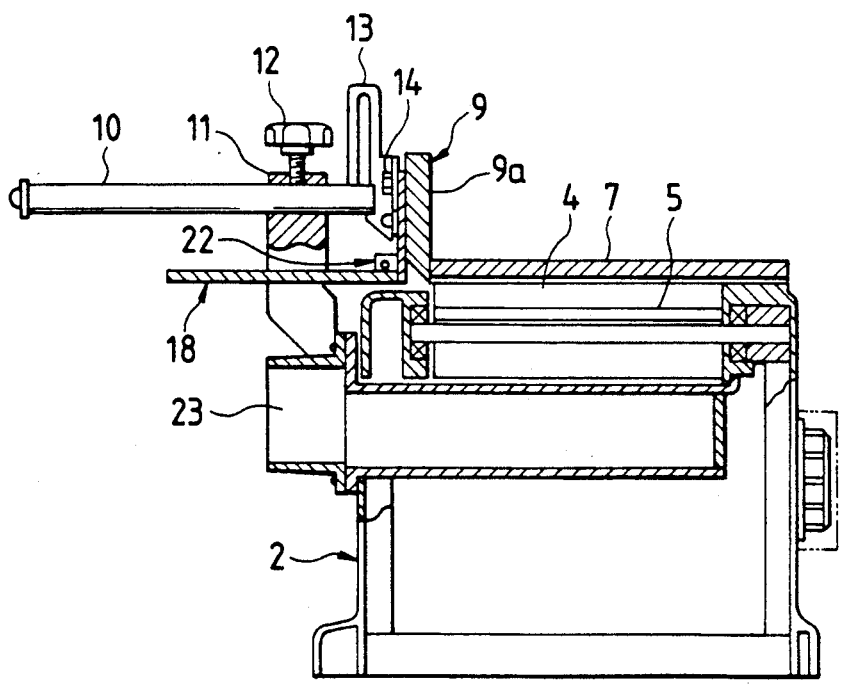
FIG. 4 is a sectional view of the safeguard apparatus along a line IV—IV shown in FIG. 2.
Figure 6A:
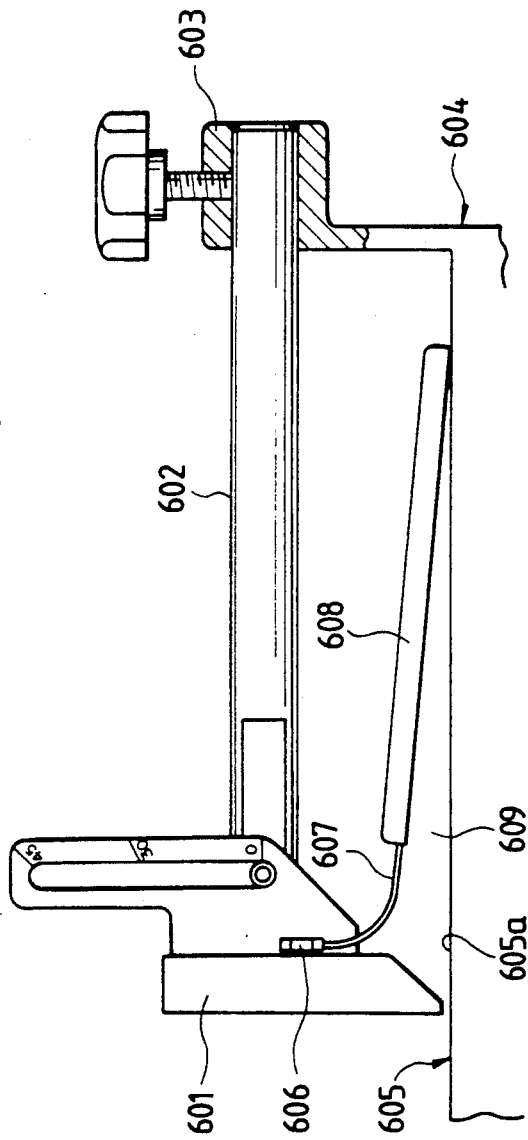
FIG. 6(A) is a partial side view of a conventional safeguard apparatus and a fence preset at an angle of 90 degrees relative to the surface of a table.
Figure 6B:
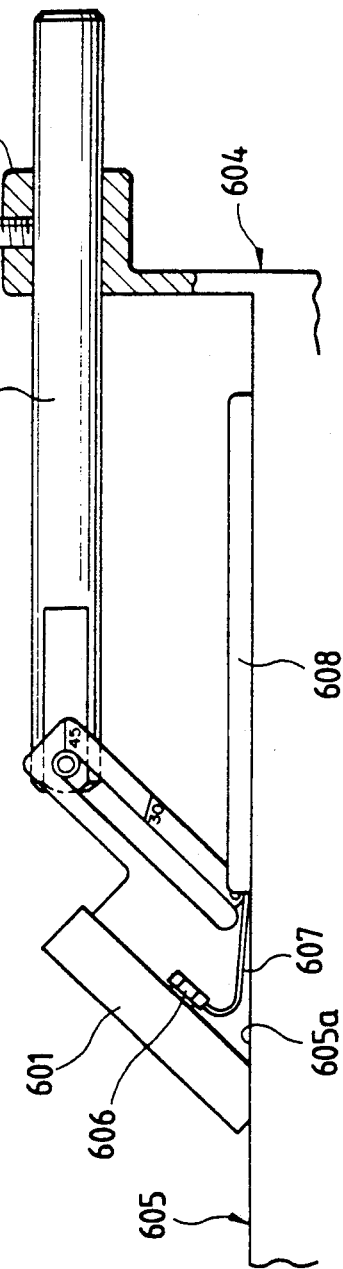
FIG. 6(B) is a partial side view of the conventional safeguard apparatus and the fence preset at an angle of 145 degrees relative to the surface of the table.

As shown in FIG. 4, cutter head 4 has a plurality of cutters 5 removably secured to the peripheral portion of the cutter by screws not shown in the drawings, and is supported by body 2 of the joint planer so that the cutting edge of each of the cutters is exposed in gap 6 between the fixed and vertical-moved tables 1a and 1b, and the cutter head is rotated by a motor (not shown).

As shown in FIGS. 1, 2, 3, 4 and 5, fence 9 of the joint planer has front surface 9a for guiding a workpiece W on the side thereof to move it forth, and has bottom 9b sloping down from the rear surface to the front surface of fence 9 and having an angle $\alpha$ of 45 degrees relative to the front surface. Fence 9 has a relatively large thickness, and a width and length approximating that of table 1.

As shown in FIGS. 2, 4 and 5, a pair of slideable bars 10 are fitted in support portions 11 at the rear of body 2 of the joint planer. Support portions 11 extend up from the upstream and downstream portions of the machine body, allowing the bars to slide in the direction of the width of table 1. Clamp screws 12 engaged in the support portions secure the bars in desired positions.

Guide members 13 are secured to the rear of fence 9 by screws 14 and located in positions aligned with slideable bars 10. Each of guide members 13 extends upward by a prescribed length from fence 9, and has a guide hold 13a shaped to be snug to a clamp bolt in a direction orthogonal to the direction of sliding of bars 10 and substantially extended in the direction of sliding. Clamp bolts 15 are fitted with levers 15a that serve as fulcrums. Each of clamp bolts 15 is rotateably and slideably engaged in a guide hole or slot 13a. The tips of the threaded portions of clamp bolts 15 are engaged in tapped holes penetrating the tip portions of the corresponding slideable bar 10 and extending in the transverse direction thereof (not shown). When clamp bolts 15 are loosened, guide members 13 can be turned about the bolts and slid with strokes determined by the lengths of guide holes or slots 13a. This movement of guide members 13 allows the angle of the front surface of fence 9 relative to surface 1c of table 1 to be preset at 90 to 145 degrees. Fence 9 is secured at a certain angle by tightening clamp bolts 15.

Figure 1:
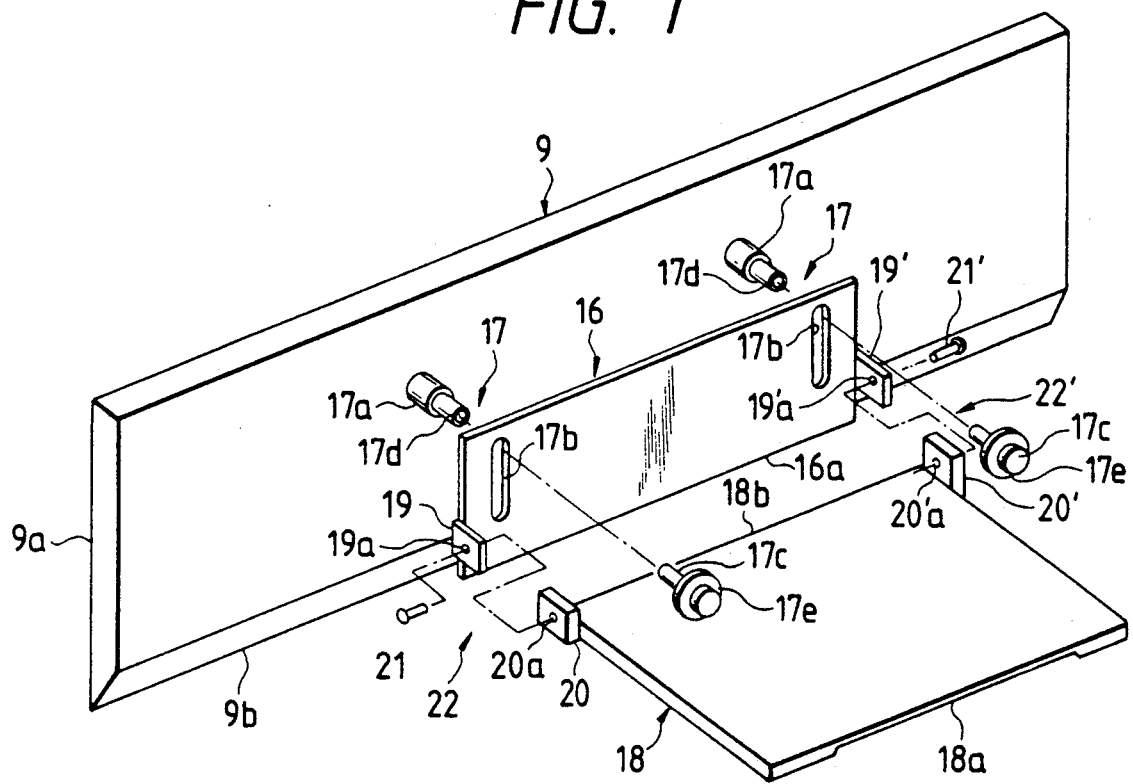
FIG. 1 is a partially exploded perspective view of an apparatus for a joint planer according to an embodiment of the present invention.

As shown in FIGS. 1 and 2, auxiliary safeguard connector 16, including principally a plate and fasteners, of the safeguard apparatus is provided at the rear of the central portion of fence 9, aligned with cutter head 4. Slide attachment means 17 are provided at the right and left portions of auxiliary safeguard connector 16 behind fence 9. When the slide attachment means are loosened the connector can be slid up and down relative to the fence. Connector 16 is made of a plate having a long dimension extending in the longitudinal direction of fence 9. Slide attachment means 17 include pins 17a having tapped holes 17d, slots 17b, and fall-off prevention screws 17c. Pins 17a horizontally extend from the rear of fence 9 and are located at an appropriate distance from each other in the longitudinal direction of the fence. Slots 17b are provided in auxiliary safeguard connector 16 in positions corresponding to those of pins 17a, and shaped to be snug to the pins in a direction orthogonal to a direction of sliding and substantially extended by a prescribed length in the direction of sliding. After pins 17a are loosely inserted through slots 17b, screws 17c are engaged in tapped holes 17d of the pins and tightened with washers 17e so that connector 16 can be slid up and down relative to fence 9.

As shown in FIG. 1, auxiliary safeguard 18 of the safeguard apparatus is a flat plate of sufficient size to cover the portion of cutter head 4, which is exposed over table 1 behind fence 9. Auxiliary safeguard 18 has bottom recess 18a so that cutters 5 do not come into contact with the bottom surface of the safeguard. But 18b of auxiliary safeguard 18 is pivotally coupled to lower end 16b of auxiliary safeguard connector 16 by hinge means 22 and 22, so that the safeguard can be swung relative to connector 16. Hinge means 22 and 22' include plates 19, 19', 20 and 20', and pins 21 and 21'. To assemble the hinge means, plates 19, 19', 20 and 20' attached to the auxiliary safeguard connector 16 and auxiliary safeguard 18 are juxtaposed with each other. Then, pins 21 and 21' are inserted through holes 19a, 20a, 19'a and 20'a of plates 19, 20, 19' and 20' so that the safeguard and the connector are pivotally coupled to each other.

When the fence 9 is displaced in the direction of the width of table 1, the angle of the front surface of the fence is preset at a desired angle of 90 to 145 degrees relative to surface 1c of the table. Auxiliary safeguard connector 16, which is attached to the rear of the fence by slide attachment means 17 allowing it to slide in conjunction with the displacement of the fence, is pivotally coupled to auxiliary safeguard 18. As a result, auxiliary safeguard 18 is slid in conjunction with the displacement of the fence to put auxiliary safeguard 18 parallel, in close proximity, or in contact with the surface of the table to securely cover the portion of cutter 5 exposed over the surface of the table behind the fence. Since safeguard connector 16 is slideable relative to the fence and auxiliary safeguard 18 is pivotally coupled to the connector, the exposed portion of cutter 5 is covered with the safeguard even while the fence is being displaced to preset the angle of its front surface 9A relative to the surface of table 1. Safety is thereby secured during the displacement of fence 9 as well as after the displacement. Since connector 16 is not required to bend, it is unlikely to develop a crack, and the life of the connector is relatively long.

As shown in FIG. 2, the preferred embodiment also includes main safeguard 7 pivotally coupled at one end to body 2 of the joint planer by stepped pin 8 allowing main safeguard 7 to horizontally turn over surface 1c of table 1. Main safeguard 7 usually covers gap 6 and cutter head 4. When a workpiece W is moved forth on surface 1c of table 1, however, the workpiece turns the safeguard outward t uncover cutter head 4. As shown in FIG. 4, the preferred embodiment also includes planed chip discharge port 23.

To summarize, when the angle of the guide surface of the fence to the surface of the table is preset at 90 degrees, the joint planer can plane a flat side of a workpiece. At that time, the auxiliary safeguard is put in contact with the surface of the table to completely cover the rear portion of the cutter head. When screws for securing the fence to the slideable bars are loosened, the fence can be turned or slid relative to the slideable bars so that the fence is tilted rearward. The auxiliary safeguard connector is then slid relative to the fence along the height thereof, and the angle of the guide surface of the fence to the surface of the table is preset at 145 degrees, for example. At that time, connector 16 and auxiliary safeguard 18 are swung relative to each other about their pivotal joints so that the safeguard is kept in contact with the surface of the table to completely cover the rear portion of the cutter head.

If the angle of the guide surface of the fence to the surface of the table is preset at 145 degrees as mentioned above, an edge of the workpiece can be chamfered by the cutter head. The portion of the cutter head, which is exposed over the surface of the table behind the fence, can be completely covered with the auxiliary safeguard, regardless of whether the guide surface of the fence is perpendicular relative to the surface of the table. Thus, the safety and efficiency of the joint planer are enhanced. In addition, since the auxiliary safeguard connector is not bent to preset the angle of the guide surface of the fence to the surface of the table, the connector does not tend to fatigue to the point of developing a crack.

Additional advantages and modifications will readily occur to those skilled in the art. The invention in its broader aspects is therefore not limited to the specific details, representative apparatus, and illustrative examples shown and described. Accordingly, departures may be made from such details without departing from the spirit or the scope of the general inventive concept.

What is claimed is:

1. A safeguard apparatus for a joint planer including a table defining a plane, a cutter head and at least one safeguard, comprising:
   a pair of bars, supported by the joint planer, horizontally arranged over and slideable parallel to the plane of the table, each bar including a respective fulcrum, the fulcrum having a common axis;
   a fence having a guide surface and a rear, the fence including a pair of guide members, each guide member lying in a plane parallel to one of the slideable bars and pivotably contacting the respective fulcrum to allow the angle of the guide surface relative to the plane of the table to vary, and each guide member being slideable relative to the respective fulcrum to allow the closest distance between the plane of the table and the guide surface to be invariant when the angle of the guide surface relative to the plane of the table varies; and
   means having a bottom surface for covering the cutter head;
   means, including a slide attachment coupled to the fence, for connecting the covering means to the rear of the fence, the slide attachment being oriented for sliding in a plane orthogonal to the plane of the table.

2. A safeguard apparatus according to claim 1, in which the covering means is pivotally coupled to the means for connecting to allow the bottom surface of the covering means to remain substantially parallel to the table as the angle of the fence varies.

3. A safeguard apparatus according to claim 1, in which the covering means is pivotally coupled to the means for connecting to allow the bottom surface of the covering means to remain in close proximity to the table as the angle of the fence varies.

4. A safeguard apparatus according to claim 1, in which the covering means is pivotally coupled to the means for connecting to allow the bottom surface of the covering means to remain in contact with the table as the angle of the fence varies.

5. A safeguard apparatus according to claim 2, the apparatus further including a main safeguard, pivotally connected to the joint planner around an axis orthogonal to the plane of the table, extending over the cutter head in front of the fence, such that a workpiece moved onto the joint planer pivots the main safeguard to expose the cutter head.

6. A safeguard apparatus according to claim 3, the apparatus further including a main safeguard, pivotally connected to the joint planner around an axis orthogonal to the plane of the table, extending over the cutter head in front of the fence, such that a workpiece moved onto the joint planer pivots the main safeguard to expose the cutter head.

7. A safeguard apparatus according to claim 4, the apparatus further including a main safeguard, pivotally connected to the joint planner around an axis orthogonal to the plane of the table, extending over the cutter head in front of the fence, such that a workpiece moved onto the joint planer pivots the main safeguard to expose the cutter head.

8. Apparatus for a joint planer including a a table defining a plane, cutter head and at least one safeguard, comprising:
   a pair of bars, supported by the joint planer, horizontally arranged over and slideable parallel to the plane of the table, each bar including a respective fulcrum, the fulcrum having a common axis;
   a fence having a guide surface and a rear, the fence including a pair of guide members, each guide member lying in a plane parallel to one of the slideable bars and pivotably contacting the respective fulcrum to allow the angle of the guide surface relative to the plane of the table to vary, and each guide member being slideable relative to the respective fulcrum to allow the closest distance between the plane of the table and the guide surface to be invariant when the angle of the guide surface relative to the plane of the table varies;
   a slide attachment including pins having tapped holes horizontally extending from the rear of the fence;
   a connector having sliding holes located in position to the pins; and
   means having a bottom surface for covering the cutter head;
   wherein the slide attachment is oriented for sliding in a plane orthogonal to the plane of the table and pivotably coupled to the covering means to allow the bottom surface of the covering means to remain substantially parallel to the plane of the table as the angle of the fence varies.

9. A safeguard apparatus according to claim 8, the apparatus further including a main safeguard, pivotally connected to the joint planner around an axis orthogonal to the plane of the table, extending over the cutter head in front of the fence, such that a workpiece moved onto the joint planer pivots the main safeguard to expose the cutter head.

10. The safeguard apparatus according to claim 2, wherein the guide members are on the rear of the fence.

11. The safeguard apparatus according to claim 2, wherein each guide member defines a guide slot fitted around the corresponding fulcrum and substantially extended for sliding relative to the corresponding fulcrum.

12. The safeguard apparatus according to claim 8, wherein the guide members are on the rear of the fence.

13. The safeguard apparatus according to claim 8, wherein each guide member defines a guide hole fitted around the corresponding fulcrum and substantially extended in the direction of sliding relative to the corresponding fulcrum.

14. The safeguard apparatus according to claim 3, wherein the guide members are on the rear of the fence.

15. The safeguard apparatus according to claim 3, wherein each guide member defines a guide hole fitted around the corresponding fulcrum and substantially extended in the direction of sliding relative to the corresponding fulcrum.

16. The safeguard apparatus according to claim 4, wherein the guide members are on the rear of the fence.

17. The safeguard apparatus according to claim 4, wherein each guide member defines a guide hole fitted around the corresponding fulcrum and substantially extended in the direction of sliding relative to the corresponding fulcrum.

* * * * *

UNITED STATES PATENT AND TRADEMARK OFFICE
CERTIFICATE OF CORRECTION

PATENT NO. : 5,022,447

DATED : June 11, 1991

INVENTOR(S) : Juzaburo Monobe

It is certified that error appears in the above-identified patent and that said Letters Patent is hereby corrected as shown below:

Claim 5, column 6, line 18, change "planner" to --planer--.

Claim 6, column 6, line 25, change "planner" to --planer--.

Claim 9, column 7, line 1, change "planner" to --planer--.

Signed and Sealed this

Twenty-third Day of March, 1993

Attest:

STEPHEN G. KUNIN

*Attesting Officer*   Acting Commissioner of Patents and Trademarks